United States Patent [19]

Melhorn et al.

[11] Patent Number: 4,955,318
[45] Date of Patent: Sep. 11, 1990

[54] TRANSPORTABLE POULTRY PLANT CART

[76] Inventors: John W. Melhorn; J. Michael Melhorn, both of Box 258, Mount Joy, Pa. 17552

[21] Appl. No.: 302,415

[22] Filed: Jan. 27, 1989

[51] Int. Cl.$^5$ .................................. A01K 31/07
[52] U.S. Cl. ..................................... 119/17; 119/18
[58] Field of Search ................. 119/17, 18, 20, 15

[56] References Cited

U.S. PATENT DOCUMENTS

| | | | |
|---|---|---|---|
| 3,058,445 | 10/1962 | Johnson | 119/17 |
| 3,228,375 | 1/1966 | Philippe | 119/17 |
| 3,429,297 | 2/1969 | Schroer | 119/17 |
| 3,536,044 | 10/1970 | Stephens et al. | 119/17 |
| 3,698,360 | 10/1972 | Rubricius | 119/17 |
| 3,738,323 | 6/1973 | Boterweg | 119/17 |
| 3,885,525 | 5/1975 | Powell et al. | 119/17 |
| 3,895,727 | 7/1975 | Rucker | 119/17 |
| 3,952,703 | 4/1976 | Erfeling | 119/18 |
| 4,084,714 | 4/1978 | Williams | 119/17 |
| 4,112,872 | 9/1978 | Van Huis | 119/17 |
| 4,285,299 | 8/1981 | Thomas | 119/17 |
| 4,763,606 | 8/1988 | Ondrasik, II | 119/17 |
| 4,831,966 | 5/1989 | Tutelian | 119/17 |

Primary Examiner—Paul J. Hirsch
Attorney, Agent, or Firm—Richard C. Litman

[57] ABSTRACT

An easily transportable poultry or animal cart is constructed of a plurality of individual cages, each cage equipped with a horizontally bifolding door at one end and a horizontally sliding door along an adjacent side. The cages may be either permanently joined during construction or temporarily joined if a smaller cart or greater versatility is desired. The cart is wheeled for mobility. The carts may be constructed as "mirror images," so that two carts may be joined together with their respective bifold doors at opposite ends of the assembly, and their respective sliding doors along a common side.

4 Claims, 2 Drawing Sheets

– 1

TRANSPORTABLE POULTRY PLANT CART

FIELD OF THE INVENTION

This invention relates generally to an improved apparatus for the conveyance and transport of poultry or the like, and more specifically to a more efficient process for transferring poultry from the poultry farm to the processing or slaughter plant.

BACKGROUND OF THE INVENTION

The food processing industry in general, and particularly the poultry industry, is a highly competitive field. As with most such industries, there is a relatively large amount of manual labor involved, particularly regarding the transport of poultry from farm to processing plant.

Current practice involves the loading of poultry into transfer carts from the layer cages at the poultry farm, then transferring the poultry to coops contained on the truck which will transport the poultry to the processing plant. When the truck arrives at the processing plant, the poultry is removed from the coops aboard the truck and placed on conveyors to be moved into the processing plant. This current practice requires a great deal of manual labor, which not only results in increased costs, but also provides a greater chance that the product may be damaged due to the increased handling and the necessary speed with which the poultry is handled.

An additional problem arises from the standard practice of using essentially cubical plastic coops as the poultry containers carried aboard the transport truck. Such coops by their nature tend to be stacked together relatively closely, which may result in some of the poultry dying before reaching the processing plant in warm weather or if the truck is delayed enroute.

One reason for this relatively labor intensive and inefficient process is the relative lack of versatility of the present equipment in common use. The need arises for means to efficiently and reliably transport poultry and other animals from farm to processing plant with a minimum of manual labor and handling of the animals, thus reducing the risk of injury or damage to the animals and providing a higher percentage of healthy animals to the processing plant.

SUMMARY OF THE INVENTION

By the present invention, an improved apparatus and method for the containment, transport and handling of poultry or other animals is provided.

Accordingly, one of the objects of the present invention is to provide an apparatus for the conveyance and transport of poultry and the like which will offer a more versatile arrangement for the loading of poultry aboard the transport truck.

Another object of the present invention is to provide an apparatus for the transport of poultry or the like which will reduce the amount of manual labor required in conveying the poultry from farm to processing plant.

A further object of the present invention is to provide an apparatus for the transport of poultry or the like which will reduce the number of animals injured or killed in transport and handling and thereby result in a greater number of saleable animals.

An additional object of the present invention is to provide an apparatus for the transport of poultry or the like which will result in the need for fewer separate cages or coops and thereby simplify handling.

Still another object of the present invention is to provide an apparatus for the transport of poultry or the like which will result in greater sanitation, by being easier to clean than the present commonly used system.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1A:
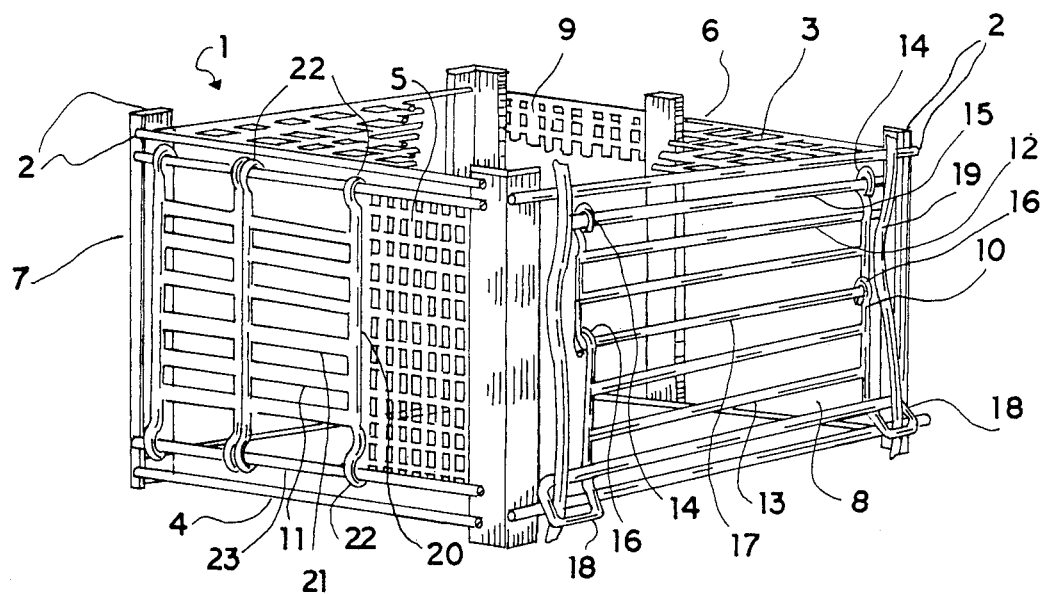
FIG. 1A is a perspective view of a single cage unit, showing the bifold and horizontally sliding doors in their closed positions.
Figure 2:
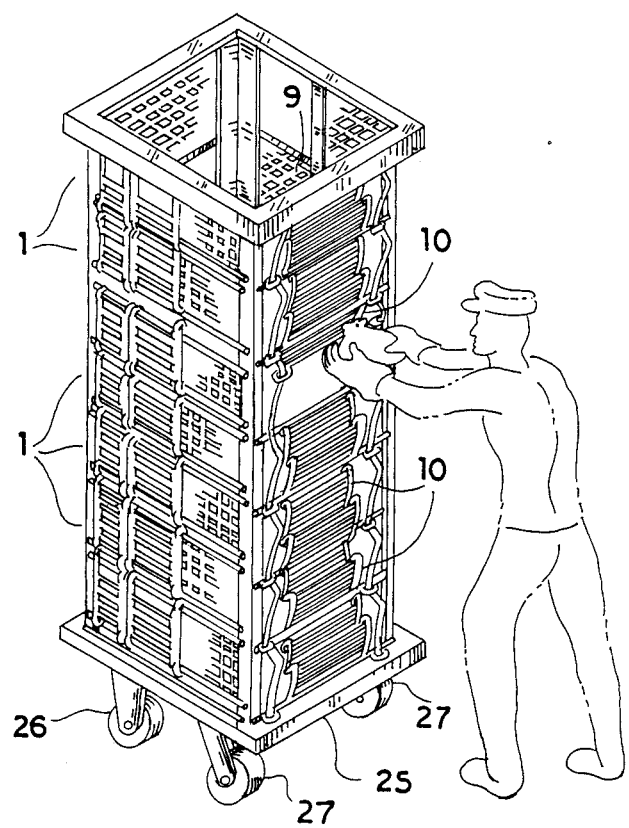
FIG. 2 is a perspective view of a cart, showing a plurality of cages and how poultry may be placed in the cart.
Figure 3:
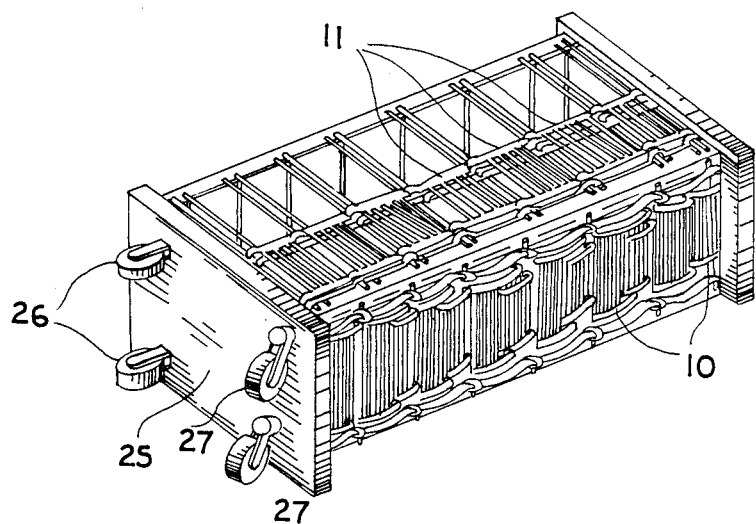
FIG. 3 is a perspective view of a cart placed upon its side, showing the arrangement of doors for the removal of poultry.

Referring now to the drawings, the present invention will be understood to relate to an improved apparatus for the containment and conveyance of poultry or the like. FIG. 1A discloses a single cage 1 or unit of a plurality of cages as shown in FIGS. 2 and 3 which comprise the apparatus. Cage 1 consists of an essentially rectangular frame 2 which is formed of steel angle or other suitable material, and comprises a top 3, floor 4, left side 5, right side 6, forward end 7, and aft end 8. The top 3, floor 4, right side 6, and a portion of the left side 5 are enclosed by a wire mesh 9 of sufficient gauge to be suitable for the containment of poultry or other animals of similar size. Aft end 8 of cage 1 contains door 10, and door 11 forms the remaining portion of left side 5 to completely enclose cage 1.

Door 10 is composed of an upper portion 12 and a lower portion 13 of essentially equal size, which when secured together operate in the manner of a standard horizontally hinged bifold door. Portions 12 and 13 of door 10 are preferably formed of a relatively heavy gauge wire in order to be relatively inflexible, or may be formed in a manner similar to that of the fixed sides of cage 1. Upper portion 12 of door 10 contains loops or eyes 14 which are formed around horizontal member 15 so as to pivot around horizontal member 15. Lower portion 13 contains similar loops or eyes 16 which are formed around lower horizontal member 17 of upper portion 12 of door 10, and loops or eyes 18 which are formed around essentially vertical members 19 at each side of door 10, and are angled so as to prevent lower portion 13 from opening outward. Thus, door 10 may be opened by applying pressure or pushing at any general location near the center hinge axis formed by lower horizontal member 17 of the upper portion 12 of door 10. Door 10 will then tend to close automatically and remain closed by force of gravity. An animal contained within cage 1 is thus prevented from escaping due to the inward folding tendency of upper and lower halves 12 and 13 of door 10.

Door 11 is preferably formed of a relatively heavy gauge wire frame 20 and members 21, or a frame 20 covered by a suitable wire mesh in the manner of other portions of cage 1. Approximately one half of the left side 5 of cage 1 containing door 11 is fixed and fashioned in a manner like that of the other fixed outer surfaces 3, 4, 6 and 7 of cage 1. Door 11, when in its closed position, forms the remainder of left side 5, and is equipped with loops or eyes 22 which cooperate with upper and lower horizontal members 23 so as to slide open horizontally along members 23.

Figure 1B:
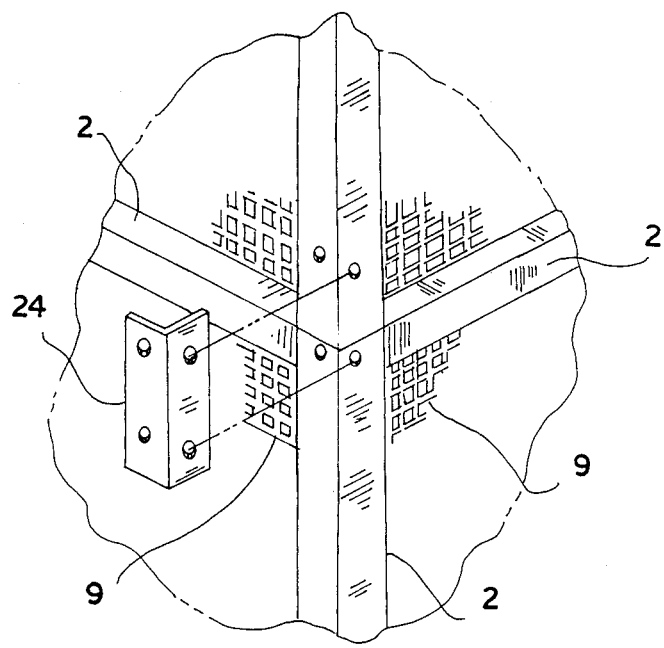
FIG. 1B is a fragmented perspective view of one corner of a cage unit, showing an alternative embodiment.

Cage 1 is preferably assembled as a single unit of a plurality of cages, as shown in FIG. 2, with vertical members of frame 2 formed as continuous lengths in order to securely fasten several cage 1 units together vertically. In such an embodiment, the top 3 and floor 4 of lower and upper adjacent units, respectively, share a common partition formed of wire mesh 9 as used in forming the remainder of the fixed surfaces of each cage 1. Such vertical members of frame 2 may also be formed as shorter lengths equal to the vertical dimension of a single cage 1 as shown in FIG. 1A, and may be joined to form a vertical stack of several cages as shown in FIG. 2, by means of relatively short lengths of angle 24 which may be bolted or otherwise affixed to the upper and lower corners of the frames 2 of vertically adjoining cages 1 as shown in FIG. 1B. Obviously, other connecting means suitable to the material used in the construction of the frames 2 may also be used.

In a similar manner two vertical stacks of cages 1 as shown in FIG. 2 may be joined. One stack is fashioned as shown in the drawings, while the second stack, not shown, would be constructed as a "mirror image" of the first stack so as to allow accessibility to doors 10 at each end of such an arrangement and also to doors 11 which would then be located along a common left side 5.

The preferred embodiment of a plurality of cages 1 permanently constructed as a unit, as shown in FIG. 2, is equipped with a base 25 which in turn is equipped with wheels and brackets 26 and 27 at each corner, thereby forming a portable cart. Wheels and brackets 26 are rigidly attached to base 25 so as to be non-steerable, while wheels and brackets 27 may be attached so as to swivel or caster for steering. Any or all of the wheels and brackets 26 and 27 may of course be equipped with brakes, not shown, preferably operated by means of a small lever at each wheel so equipped, in a manner well known in the industry. Non-steerable wheels and brackets 26 are installed adjacent to the front end 7 of the cart, while steerable wheels and brackets 27 are installed adjacent to the aft end 8 of the cart.

In use, the cart may be quickly and easily loaded by one person by means of bifold doors 10 as shown in FIG. 2. By applying pressure with one hand or arm near horizontal member 17 of door 10 the door will fold inward, thus allowing the poultry or other animal to be easily inserted into cage 1 with the other hand. After placing the animal in the cage, door 10 will automatically close due to gravity and any animal contained within the cage will be unable to escape due to the inward folding nature of the door 10. This results in a considerable savings of labor over present methods. After loading the cart, it may be easily rolled through the layer house by a single person and placed directly aboard the truck for transport to the processing plant. The carts may of course be easily arranged to allow more or less air space between carts in order to prevent possible overheating or freezing of the poultry or animals, thereby resulting in fewer animals dying in transport than with current practice.

At the processing plant, the cart is unloaded from the truck and rolled to the desired location for removing the poultry. Upon reaching the desired location the cart is tipped over upon its right side 6, thereby placing sliding doors 11 on the upper surface of the cart as it lies upon its right side 6 as shown in FIG. 3. Sliding doors 11 may then be opened and the poultry or other animals contained within the cart may then be removed for processing. Thus, poultry or other animals may be transported or conveyed from the layer house to the processing plant with a minimum of handling and manual labor, thereby reducing the chance of injury or damage to the product and resulting loss of potential profits.

It is to be understood that the present invention is not limited to the sole embodiment described above, but encompasses any and all embodiments within the scope of the following claims.

We claim:

1. A method of transporting and unloading animals including the following steps:

providing a plurality of animal cages having four vertical sides and a top and bottom for carrying individual animals, each said cage having first and second separate closable entrances for placing and removing animals, said closable entrances being disposed on adjacent vertical sides of said cage;

stacking said plurality of cages in a vertical manner upon a wheeled cart;

placing animals inside each said cage through said first entrance;

transporting said cages and animals upon said wheeled cart to a destination;

tilting said stack of cages until they lie in a generally horizontal disposition with said second entrances facing vertically upwards;

removing said animals through said second entrances; whereby a person removing said animals through said second entrances can quickly remove the animals from the cages without having to change levels and the animals and cages are transportable in a standard vertically stacked manner.

2. The method of transporting and unloading animals according to claim 1, including:

providing an inwardly folding door that covers said first entrance to prevent the animals from pushing open the closable entrance.

3. The method of transporting and unloading animals according to claim 1, including:

providing a sliding door to cover and uncover said second entrance to allow a person unloading said animals to quickly open the entrances.

4. The method of transporting and unloading animals according to claim 1, including:

joining said stacked cages and said wheeled cart structurally together.

* * * * *